US011610392B1

(12) United States Patent
Zhou et al.

(10) Patent No.: US 11,610,392 B1
(45) Date of Patent: Mar. 21, 2023

(54) METHODS, DEVICES, AND SYSTEMS FOR IDENTIFYING THE COMPOSITION OF MATERIALS

(71) Applicant: Hangzhou Tianyan Zhilian Technology Co., Ltd., Hangzhou (CN)

(72) Inventors: Yuan Zhou, Hangzhou (CN); Tian Tan, Hangzhou (CN)

(73) Assignee: Hangzhou Tianyan Zhilian Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/946,076

(22) Filed: Sep. 16, 2022

(30) Foreign Application Priority Data

Sep. 16, 2021 (CN) .......................... 202111087479.3

(51) Int. Cl.
*G06V 10/74* (2022.01)
*G06V 10/774* (2022.01)
(Continued)

(52) U.S. Cl.
CPC .......... *G06V 10/7747* (2022.01); *G06V 10/26* (2022.01); *G06V 10/30* (2022.01); *G06V 10/761* (2022.01); *G06V 10/95* (2022.01)

(58) Field of Classification Search
CPC .... G06V 10/7747; G06V 10/26; G06V 10/30; G06V 10/761; G06V 10/95; G01N 2223/643; G01N 23/223
See application file for complete search history.

(56) References Cited

U.S. PATENT DOCUMENTS

| 8,810,673 B2 | 8/2014 | Yoshizumi |
| 9,330,494 B2 * | 5/2016 | Schultz .................. G09G 5/363 |

(Continued)

FOREIGN PATENT DOCUMENTS

| AU | 2015275308 B2 * | 3/2018 | ........... G06T 15/005 |
| WO | WO-2017170607 A1 * | 10/2017 | ............. G06Q 30/06 |

OTHER PUBLICATIONS

Translation of WO2017170607 (Year: 2017).*
(Continued)

*Primary Examiner* — Carol Wang
(74) *Attorney, Agent, or Firm* — American Patent Agency PC; Daniar Hussain; Stephen M. Hou

(57) ABSTRACT

Computer-implemented methods for determining the material composition of an object are disclosed. The method may include obtaining a target image of the object; determining a material cross-sectional image corresponding to a material to be detected and included in the target image; determining a most similar candidate image to the target image and corresponding candidate material composition information, where the most similar candidate image is selected from a target database; generating a material composition area image set comprising a plurality of material composition area images associated with the material cross-sectional image and the most similar candidate image; determining a set of material composition information corresponding to each of the plurality of material composition area images in the material composition area image set; and obtaining a material composition information set from the set of material composition information. This method improves the recognition accuracy and recognition efficiency of the material composition.

18 Claims, 10 Drawing Sheets

(51) Int. Cl.
*G06V 10/94* (2022.01)
*G06V 10/26* (2022.01)
*G06V 10/30* (2022.01)

(56) References Cited

U.S. PATENT DOCUMENTS

| | | |
|---|---|---|
| 10,248,744 B2 | 4/2019 | Schissler et al. |
| 10,710,119 B2 | 7/2020 | Kumar et al. |
| 10,810,469 B2 | 10/2020 | Sunkavalli et al. |
| 2017/0263011 A1 | 9/2017 | Yalniz et al. |

OTHER PUBLICATIONS

Schwartz et al., "Recognizing Material Properties from Images", IEEE Transactions on Pattern Analysis and Machine Intelligence, vol. 14, No. 8, Aug. 8, 2017, pp. 1-14.

\* cited by examiner

METHODS, DEVICES, AND SYSTEMS FOR IDENTIFYING THE COMPOSITION OF MATERIALS

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of computer technology, and in particular, methods, apparatuses, electronic devices, and readable media for identifying the composition of materials.

BACKGROUND OF THE INVENTION

The statements in the background of the invention are provided to assist with understanding the invention and its applications and uses, and may not constitute prior art.

With the development of human society, improving the utilization rate of resources, especially the efficiency of recycling and processing recyclable materials, is of great significance for the re-use of resources and for environmental conservation. At present, when identifying the composition of materials, the typical methods are manual identification or laboratory inspection.

However, when these typical methods are adopted, there are often the following technical problems: First, manual identification is easily affected by human subjective factors, resulting in low accuracies of material composition identification. Second, for mixed recyclable materials, it is often necessary to identify the composition through a variety of inspection methods, which leads to more time spent on a single identification task, and which also affects the identification efficiency of material composition identification.

It is against this background that the present invention was developed.

BRIEF SUMMARY OF THE INVENTION

Through methods for determining material composition by various embodiments of the present disclosure, both the accuracy and the efficiency of material composition identification may be markedly improved. For example, in a first step, a target image is acquired. Then, a material cross-sectional image included in the target image and corresponding to the material to be detected is determined. In practice, due to the large variety of materials to be tested, the material composition is often inspected by means of manual identification or laboratory inspection, and it is impossible to comprehensively identify the material composition of all the materials to be tested. By acquiring the target image, the comprehensiveness of the identification of the material composition of the material to be detected may be improved.

In practice, the materials to be tested are often composed of multiple materials. For example, a wire may include outer layers of insulation, conductors, and shields. The outer insulating layer may be insulating plastic. The conductor may be a copper wire, and the shielding layer may be a mesh structure braided by metal wires. It is often impossible to straightforwardly determine the wire composition from the outside alone. Therefore, by determining the cross-sectional image of the material, the composition of the material may be well determined. Then, based on the above-mentioned material cross-section image, a material composition area image set is generated. By cropping the cross-sectional image of the material according to the area where the material composition is located, the amount of data processing necessary for the subsequent identification of the material composition according to the image is significantly reduced. Finally, material composition information corresponding to each material composition area image in the material composition area image set is determined, and a material composition information set is obtained.

The material composition information corresponding to each material composition area image in the material composition area image set is determined by image recognition, to realize the identification of the material composition. The methods improve the recognition accuracy and recognition efficiency of the material composition.

The present invention relates to methods, apparatuses, electronic devices, and readable media for identifying the composition of materials. More specifically, in various embodiments, the invention is a computer-implemented method for determining a composition of materials of an object, including obtaining a target image of the object; determining a material cross-sectional image corresponding to a material to be detected and included in the target image; determining a most similar candidate image to the target image and corresponding candidate material composition information, where the most similar candidate image is selected from a target database; generating a material composition area image set including a plurality of material composition area images associated with the material cross-sectional image and the most similar candidate image; determining a set of material composition information corresponding to each of the plurality of material composition area images in the material composition area image set; and obtaining a material composition information set from the set of material composition information.

In some embodiments, determining a material cross-sectional image corresponding to a material to be detected and included in the target image includes determining a set of coordinates of the material cross-sectional image corresponding to the material to be detected and included in the target image; obtaining a material cross-section coordinate set using a pre-trained material cross-section detection model; and cropping the target image to generate cropped material cross-section images using the material cross-section coordinate set.

In some embodiments, generating the material composition area image set including a plurality of material composition area images associated with the material cross-sectional image includes pre-processing on the material cross-sectional image to generate a pre-processed material cross-sectional image; and generating the material composition area image set by inputting the pre-processed material cross-sectional image into a pre-trained material composition detection network.

In some embodiments, generating the material composition area image set including a plurality of material composition area images associated with the material cross-sectional image, further includes inputting the pre-processed material cross-sectional image into the pre-trained material composition detection network to generate at least one set of detection frame information; determining an area where a material composition contained in the material to be detected is framed by the set of detection frame information; and generating a material composition area image.

In some embodiments, pre-processing on the material cross-sectional image to generate a pre-processed material cross-sectional image includes performing color space conversion on the material cross-section image to generate a first candidate image; performing brightness adjustment on the first candidate image to generate a second candidate image; performing color space conversion on the second candidate image to generate a third candidate image; performing white balance adjustment on the third candidate image to generate a fourth candidate image; performing noise reduction processing on the fourth candidate image to generate a fifth candidate image; and performing image sharpening processing on the fifth candidate image to generate the pre-processed material cross-sectional image.

In some embodiments, the set of material composition information includes material composition content information, and a density of the composition of materials.

In some embodiments, the set of material composition information further includes material proportion information; where determining a set of material composition information corresponding to each of the plurality of material composition area images in the material composition area image set includes incorporating the material proportion information; and where the material proportion information includes a ratio of a mass of the composition of materials to a mass of the material cross-sectional image.

In some embodiments, the computer-implemented method further includes inputting the target image of the object into a pre-trained similarity model to generate a target feature vector; determining a similarity between the target feature vector and a feature vector corresponding to a candidate image stored in a target database and a candidate material composition information; and generating a similarity value and a similarity value set. In some embodiments, the invention is an electronic device for determining a composition of materials of an object, including an acquisition unit, configured to acquire a target image; a first determining unit, configured to determine a material cross-sectional image corresponding to a material to be detected and included in the target image, where the material cross-sectional image is a most similar candidate image, and where the most similar candidate image is selected from a target database; a generating unit, configured to generate a material composition area image set including a plurality of material composition area images associated with the material cross-sectional image and the most similar candidate image; and a second determining unit, configured to determine a set of material composition information corresponding to each of the plurality of material composition area images in the material composition area image set, and obtain a material composition information set from the set of material composition information.

In some embodiments, the electronic device further includes one or more processors; a storage device on which program code are stored; the program code, when executed by the one or more processors, cause the one or more processors to obtain a target image of the object; determine a material cross-sectional image corresponding to a material to be detected and included in the target image; determine a most similar candidate image to the target image and corresponding candidate material composition information, where the most similar candidate image is selected from a target database; generate a material composition area image set including a plurality of material composition area images associated with the material cross-sectional image and the most similar candidate image; determine a set of material composition information corresponding to each of the plurality of material composition area images in the material composition area image set; and obtain a material composition information set from the set of material composition information.

In some embodiments, the invention is a computer-readable non-transitory medium having stored thereon program code for determining a composition of materials of an object, where the program code, when executed by a processor, causes the processor to obtain a target image of the object; determine a material cross-sectional image corresponding to a material to be detected and included in the target image; determine a most similar candidate image to the target image and corresponding candidate material composition information, where the most similar candidate image is selected from a target database; generate a material composition area image set including a plurality of material composition area images associated with the material cross-sectional image and the most similar candidate image; determine a set of material composition information corresponding to each of the plurality of material composition area images in the material composition area image set; and obtain a material composition information set from the set of material composition information.

In some embodiments, the program code to determine a material cross-sectional image corresponding to a material to be detected and included in the target image includes program code to determine a set of coordinates of the material cross-sectional image corresponding to the material to be detected and included in the target image; obtain a material cross-section coordinate set using a pre-trained material cross-section detection model; and crop the target image to generate cropped material cross-section images using the material cross-section coordinate set.

In some embodiments, the program code includes program code to pre-process on the material cross-sectional image to generate a pre-processed material cross-sectional image; and generate the material composition area image set by inputting the pre-processed material cross-sectional image into a pre-trained material composition detection network.

In some embodiments, the program code further includes program code to input the pre-processed material cross-sectional image into the pre-trained material composition detection network to generate at least one set of detection frame information; determine an area where a material composition contained in the material to be detected is framed by the set of detection frame information; and generate a material composition area image.

In some embodiments, the program code to pre-process on the material cross-sectional image to generate a pre-processed material cross-sectional image includes program code to perform color space conversion on the material cross-section image to generate a first candidate image; perform brightness adjustment on the first candidate image to generate a second candidate image; perform color space conversion on the second candidate image to generate a third candidate image; perform white balance adjustment on the third candidate image to generate a fourth candidate image; perform noise reduction processing on the fourth candidate image to generate a fifth candidate image; and perform image sharpening processing on the fifth candidate image to generate the pre-processed material cross-sectional image.

In some embodiments, the set of material composition information includes material composition content information, and a density of the composition of materials.

In some embodiments, the set of material composition information further includes material proportion information; where the program code to determine a set of material composition information corresponding to each of the plurality of material composition area images in the material composition area image set includes program code to incorporate the material proportion information; and where the material proportion information includes a ratio of a mass of the composition of materials to a mass of the material cross-sectional image.

In some embodiments, the program code further causes the processor to input the target image of the object into a pre-trained similarity model to generate a target feature vector; determine a similarity between the target feature vector and a feature vector corresponding to a candidate image stored in a target database and a candidate material composition information; and generate a similarity value and a similarity value set.

Other aspects and embodiments of the present invention include the methods and processes comprising the steps described herein, and also include the processes and modes of operation of the systems and devices described herein.

Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which.

DETAILED DESCRIPTION OF THE INVENTION

With reference to the figures provided, embodiments of the present invention are now described in detail.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
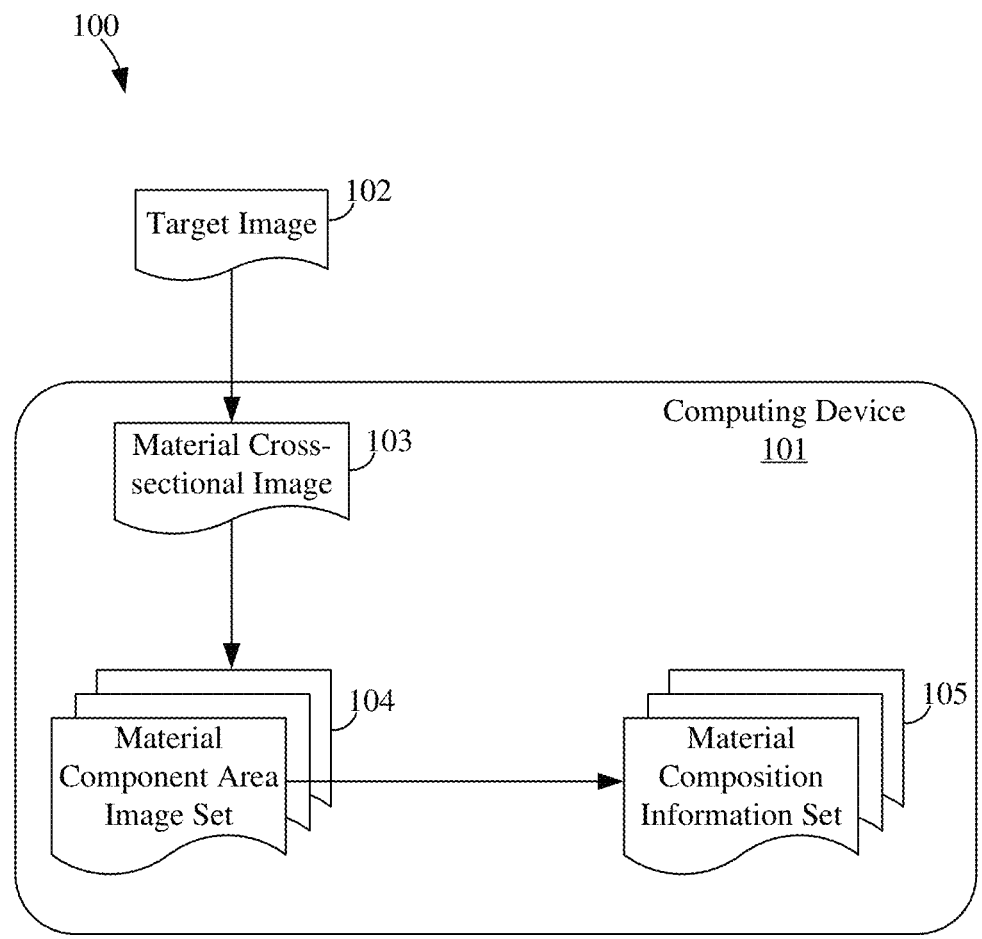
FIG. 1 shows a schematic diagram of an application scenario of the method for determining material composition according to some embodiments of the present disclosure.

FIG. 1 is a schematic diagram 100 of an application scenario of the method for determining material composition according to some embodiments of the present disclosure. First, a computing device 101 acquires a target image 102. Then, the computing device 101 determines a material cross-sectional image 103 corresponding to the material to be detected and included in the target image 102. Next, the computing device 101 generates a material composition area image set 104 associated with the above-mentioned material cross-sectional image 103. Finally, the computing device 101 determines the material composition information corresponding to each material composition area image in the above-mentioned material composition area image set 104 to obtain the material composition information set 105.

It should be noted that the above computing device 101 may be hardware and/or software. When the computing device is hardware, it may be implemented as a distributed cluster composed of multiple servers or terminal devices or may be implemented as a single server or a single terminal device. When a computing device is embodied as software, it may be installed in the hardware devices listed above. It may be implemented, for example, as multiple software or software modules for providing distributed services, or as a single software or software module. There is no specific limitation here. An "executive body" and an "execution subject" may be a hardware processor, or equivalent processor that executes computer-executable program code, in some embodiments.

The number of computing devices shown in FIG. 1 is merely illustrative. There may be any number of computing devices depending on implementation needs.

Figure 2:
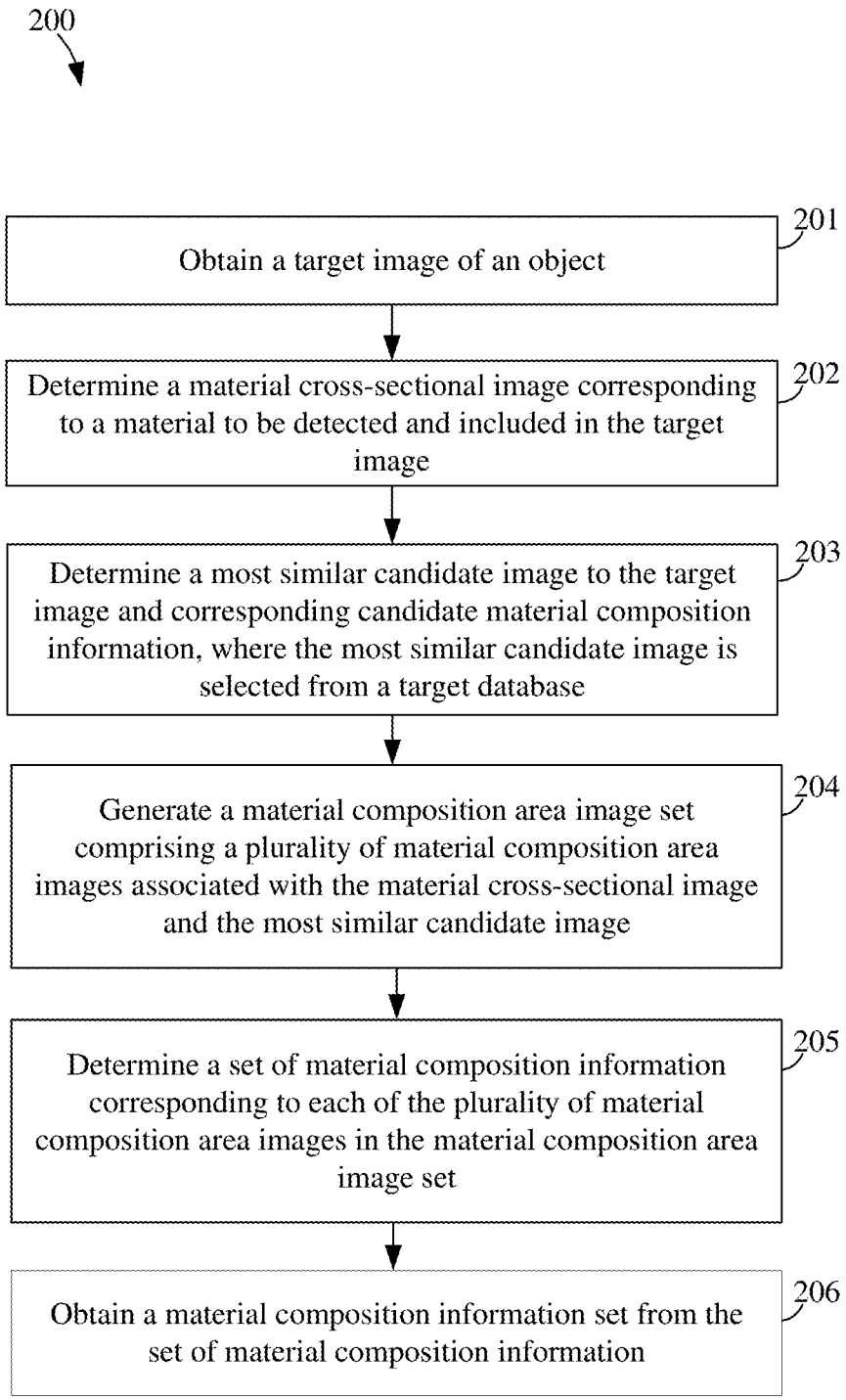
FIG. 2 shows a flowchart of some embodiments of a method for determining material composition according to the present disclosure.

FIG. 2 shows a flowchart 200 of some embodiments of a method for determining material composition according to the present disclosure. This method for determining the composition of materials includes the following steps: First, in step 201, the system obtains or acquires a target image. In some embodiments, the execution body of the method for determining the composition of the material (e.g., the computing device 101 shown in FIG. 1) may acquire the above-mentioned target image through a wired connection or a wireless connection. The above-mentioned target image may be an image containing the material to be detected. The above-mentioned materials to be detected may be materials that need to be identified by material composition. For example, the above-mentioned material to be detected may be "wire." It should be noted that the above wireless connection methods may include, but are not limited to, 3G/4G/5G connections, Wi-Fi connections, Bluetooth connections, WiMAX connections, Zigbee connections, UWB (Ultra-Wide Band) connections, and other currently known or developed in the future wireless connections.

As an example, the above-mentioned target image may be an image captured by a target camera. The above-mentioned target camera may be a camera installed on the target device. For example, the above-mentioned target device may be a conveyor device for transporting the material to be inspected.

In some embodiments, in step 202, the system then determines a material cross-sectional image corresponding to a material to be detected and included in the target image.

Next, in step 203, the system determines a most similar candidate image to the target image and corresponding candidate material composition information, where the most similar candidate image is selected from a target database, as described in further detail below. In some embodiments, the above-mentioned executive body may determine a most similar candidate image to the target image and corresponding candidate material composition information. The above-mentioned candidate material composition information is corresponding to the above-mentioned most similar candidate image.

As an example, the above-mentioned execution subject may perform feature compression on the above-mentioned target image by using a pre-trained similarity model to generate a target feature vector. Then, through a target similarity algorithm, the similarity between the target feature vector and the feature vector corresponding to the candidate image stored in the target database and the candidate material composition information is determined, which generates a similarity value and a similarity value set is obtained.

Secondly, from the candidate images stored in the target database, the candidate images whose corresponding similarity value satisfies the screening conditions are selected as the material cross-section images. The above-mentioned screening condition is used to screen out the candidate image most similar to the above-mentioned target image from the above-mentioned target database. For example, the filtering condition may be that the similarity value corresponding to the candidate image is the maximum value among the similarity values corresponding to all candidate images stored in the target database. The above screening condition may also be that the similarity value corresponding to the candidate image is the minimum value among the similarity values corresponding to all candidate images stored in the target database. The above-mentioned target database may be a database that stores the composition information of candidate images and candidate materials. For example, the above target database may be a MySQL database. As another example, the above target database may also be an Oracle database. The above similarity model may be, but is not limited to, any one of the following: a ResNet model, a VGG model, a GoogleNet model, or a DarkNet model.

The above similarity model may be generated by training the initial similarity model by using the image pre-marking the position of the cross-sectional area and the material composition information corresponding to the image pre-marking the position of the cross-section area as a training sample. The above-mentioned candidate image may be an image in which the position of the cross-sectional area is marked in advance.

The above-mentioned candidate material composition information may be material composition information of the material included in the candidate image. The candidate material composition information may include: a material composition position and a material composition ratio. The material composition position may be represented by a coordinate set of the region where the material composition is located in the above candidate image. The proportion of material compositions may be represented by the volume proportion of the material compositions in the materials contained in the candidate image. The coordinates in the coordinate set may be the coordinates of feature points on the boundary of the area where the material composition is located. Material compositions may be the materials that make up the material. For example, the material composition may be "copper wire." For example, the above-mentioned target similarity algorithm may be a cosine similarity algorithm. For example, the above-mentioned target feature vector may be an activation vector output by any layer of the network structure in the above-mentioned similarity model.

In step 204, the system generates a material composition area image set associated with the material cross-sectional image. In some embodiments, the system generates a material composition area image set associated with the material cross-sectional image and the most similar candidate image. In some embodiments, the system skips step 204, and goes from step 203 directly to step 205. In some embodiments, the above-mentioned execution body may generate a material composition region image set associated with the material cross-sectional image. As an example, the above-mentioned execution body may first query the above-mentioned target database to obtain at least one candidate material composition information corresponding to the above-mentioned material cross-sectional image. Then, at least one candidate material composition information corresponding to the above-mentioned material cross-sectional image is obtained and associated with the query, and a material composition area image set is generated. The above-mentioned execution body may determine the image of the material composition area associated with the position of the material composition included in the candidate material composition information.

For example, the material composition positions included in the at least one candidate material composition information may be: {[562.794, 578.082], [564.164, 545.292], [597.041, 506.849], [660.054, 487.671], [687.452, 743.434], [743.616], 434.246]}. The above-mentioned execution body may perform curve fitting associated with the coordinates in the position of the material composition to generate the boundary of the material composition area.

Then, the image corresponding to the area surrounded by the boundary of the material composition area is determined as the material composition area image.

In step 205, the system determines the material composition information corresponding to each material composition area image in the material composition area image set and, in step 206, the system obtains a material composition information set from the set of material composition information. In some embodiments, the above-mentioned execution body may determine the material composition information corresponding to each material composition area image in the material composition area image set and obtain a material composition information set from the set of material composition information. The material composition may be the material constituting the material. For example, the material composition may be "copper wire." The material composition information may represent the material proportion of material compositions.

As an example, the above-mentioned execution subject may determine the material composition ratio in the candidate material composition information corresponding to the material composition area image in the above-mentioned target database as the material composition information.

The above-mentioned embodiments of the present disclosure enjoy the following beneficial effects: the accuracy and the efficiency of material composition identification are improved through the methods for determining material composition according to some embodiments of the present disclosure. Specifically, the reasons for the low material recognition accuracy and recognition efficiency are: (1) through manual identification, it is easily affected by human subjective factors, resulting in low accuracy of material composition identification; and (2) for mixed recyclable materials, it is often necessary to perform composition identification through various inspection methods, which takes more time, and affects the identification efficiency of material composition identification.

Based on this, in the methods for determining material composition according to some embodiments of the present disclosure, first, a target image is acquired. In practice, due to the large variety of materials to be tested, the material composition is often inspected by means of manual identification or laboratory inspection, and it is very difficult or impossible to comprehensively identify the material composition of all the materials to be tested. By acquiring the target image, the comprehensiveness of the identification of the material composition of the material to be detected may be improved. In addition, a material cross-sectional image corresponding to the material to be detected and included in the target image is determined.

In actual situations, the materials to be tested are often composed of multiple materials. For example, a wire may include outer layers of insulation, conductors, and shields. The outer insulating layer may be insulating plastic. The conductor may be a copper wire, and the shielding layer may be a mesh structure braided by metal wires. It is often very difficult or impossible to intuitively determine the wire composition from the outside. Therefore, by determining the cross-sectional image of the material, the composition of the material may be well determined. Then, based on the above-mentioned material cross-section image, a material composition area image set is generated. By intercepting the cross-sectional image of the material associated with the area where the material composition is located, the data processing amount of subsequent identification of the material composition based on the image is reduced. Finally, the material composition information corresponding to each material composition area image in the material composition area image set is determined, and the material composition information set is obtained. In some embodiments, the material composition information corresponding to each material composition area image in the material composition area image set is determined by image recognition to realize the identification of the material composition. This method improves the recognition accuracy and recognition efficiency of the material composition.

Figure 3:
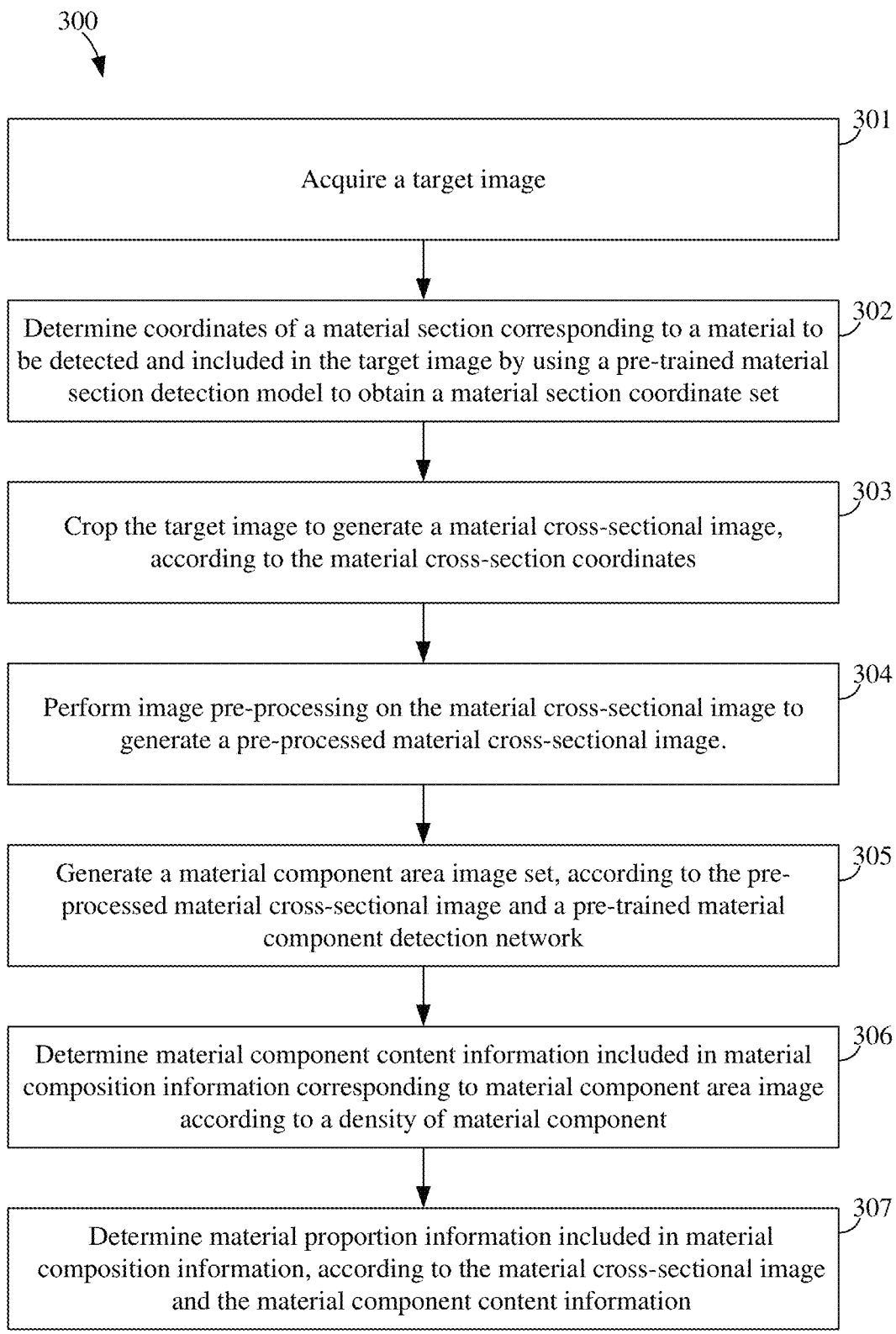
FIG. 3 shows a flowchart of other embodiments of the method for determining material composition according to the present disclosure.

FIG. 3 shows a flowchart 300 of other embodiments of the method for determining material composition according to the present disclosure. Flowchart 300 includes the following steps: First, in step 301, the system acquires a target image. In some embodiments, for the specific implementation of step 301 and the technical effects brought about by it, reference may be made to step 201 in those embodiments corresponding to FIG. 2, and details are not repeated here.

Next, in step 302, the system determines the coordinates of the material section corresponding to the material to be detected and included in the target image by using the pre-trained material section detection model and obtains a material section coordinate set.

In some embodiments, the execution body of the method for determining the composition of the material (for example, the computing device 101 shown in FIG. 1) may use a pre-trained material cross-section detection model to determine the material cross-section corresponding to the to-be-detected material included in the target image coordinates to obtain the material cross-section coordinate set. The material cross-section detection model may be a model for identifying the coordinates of the feature points on the boundary of the material cross-section corresponding to the material to be detected and included in the target image. The above-mentioned material cross-section coordinate set may be the coordinates of points on the boundary of the material cross-section.

Figure 7:
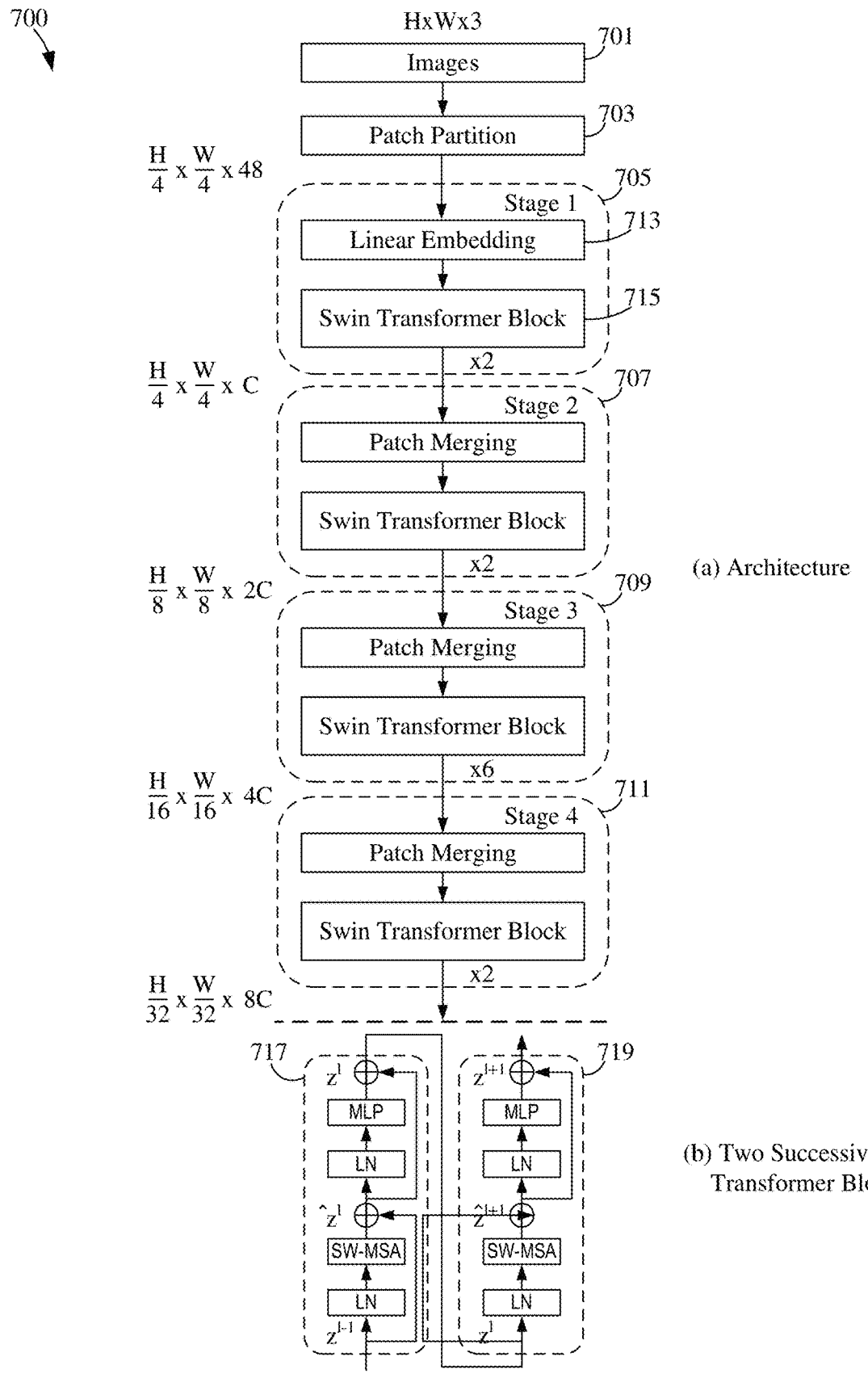
FIG. 7 shows a Swin Transformer model used as a material section detection model.

As an example, the above-mentioned material section detection model may be a Swin Transformer model, which is shown in FIG. 7. The above target detection model may include: a backbone network, a feature fusion network, or a detection network. The above backbone network may adopt the network structure of a Swin Transformer. The above feature fusion network may adopt the network structure of PANet (Path Aggregation Network for Instance Segmentation). The above detection network may adopt the network structure of YOLOV3 head (You Only Look Once Version 3 head). The activation function of the above target detection network model may be a LeakyReLU activation function. The above target detection network model may use the BECLogits function, the BCEclsloss (cross entropy loss function) function and the GIOU Loss (Generalized Intersection over Union Loss) function as the loss function.

As another example, the above-mentioned material cross-section detection model may include: a feature extraction network, a region of interest pooling network, a feature concatenating layer, and/or an activation network. The above feature extraction network includes four stages, of which each stage comprises multiple Swin Transformer blocks. As an example, each stage may contain [2,2,18,2] Swin Transformer blocks. Inside each block, there are Multi-Head Self Attention (MSA) and Multi-Layer Perceptron (MLP) blocks. A LayerNorm (LN) block is applied before each MSA and MLP block, and a residual connection is applied after each MSA and MLP block. The above-mentioned region of interest pooling network may include: a first sub-pyramid region of interest pooling layer, a second sub-pyramid region of interest pooling layer, a third sub-pyramid region of interest pooling layer, and/or a fourth sub-pyramid region of interest pooling layer pooling layer. The above activation network may include: a first fully connected layer and/or a second fully connected layer. The above-mentioned executive body may input the above-mentioned target image into the above-mentioned feature extraction network to generate a candidate feature map. Then, through the above-mentioned region of interest pooling network including the first sub-pyramid region of interest pooling layer, the second sub-pyramid region of interest pooling layer, the third sub-pyramid region of interest pooling layer, and the fourth sub-pyramid region of interest pooling layer performs feature extraction on the above candidate feature maps in parallel.

The above-mentioned first sub-pyramid region of interest pooling layer may divide the above-mentioned candidate feature map into 1×1 sub-regions, and then extract the first feature vector from the 1×1 sub-regions. The above-mentioned second sub-pyramid region of interest pooling layer may divide the above-mentioned candidate feature map into 3×3 sub-regions, and then extract the second feature vector from the 3×3 sub-regions. The above-mentioned third sub-pyramid region of interest pooling layer may divide the above-mentioned candidate feature map into 5×5 sub-regions, and then extract a third feature vector from the 5×5 sub-regions. The above-mentioned fourth sub-pyramid region of interest pooling layer may divide the above-mentioned candidate feature map into 7×7 sub-regions, and then extract a fourth feature vector from the 7×7 sub-regions.

Further, the feature concatenating layer may perform feature concatenating on the first feature vector, the second feature vector, the third feature vector, and the fourth feature vector to generate a fifth feature vector. Finally, the above-mentioned fifth feature vector is inputted into the activation network to obtain the material cross-section coordinate set. The dimensions of the first fully connected layer and the second fully connected layer are both 1,024.

Because the first sub-pyramid region of interest pooling layer, the second sub-pyramid region of interest pooling layer, the third sub-pyramid region of interest pooling layer, and the fourth sub-pyramid region of interest pooling layer included in the region of interest pooling network share different division scale of the candidate feature map, that is, the feature division is pyramid-shaped, the fine-grained and coarse-grained feature extraction of the above target image may be realized, and more abundant feature information may be obtained.

In addition, considering that the feature vectors obtained by different sub-pyramid region of interest pooling layers have different effects on the generation of subsequent results, the present disclosure also sets an adaptive and learnable feature vector for the feature vectors obtained by each sub-pyramid region of interest pooling layer weights. In this way, while ensuring the extraction of rich features, the proportion of features is dynamically adjusted by weights, thereby greatly improving the accuracy of material cross-section detection.

In step 303, associated with the set of material cross-section coordinates, the system crops the target image to generate a material cross-section image. In some embodiments, the above-mentioned execution body may crop the above-mentioned target image associated with the above-mentioned material cross-section coordinate set, which generates the above-mentioned material cross-section image.

As an example, the above-mentioned execution body may perform curve fitting associated with the material cross-section coordinates in the above-mentioned material cross-section coordinate set to generate the boundary of the material cross-section. Then, the image corresponding to the area surrounded by the boundary of the material cross section is used as the above material cross section image.

Figure 4:
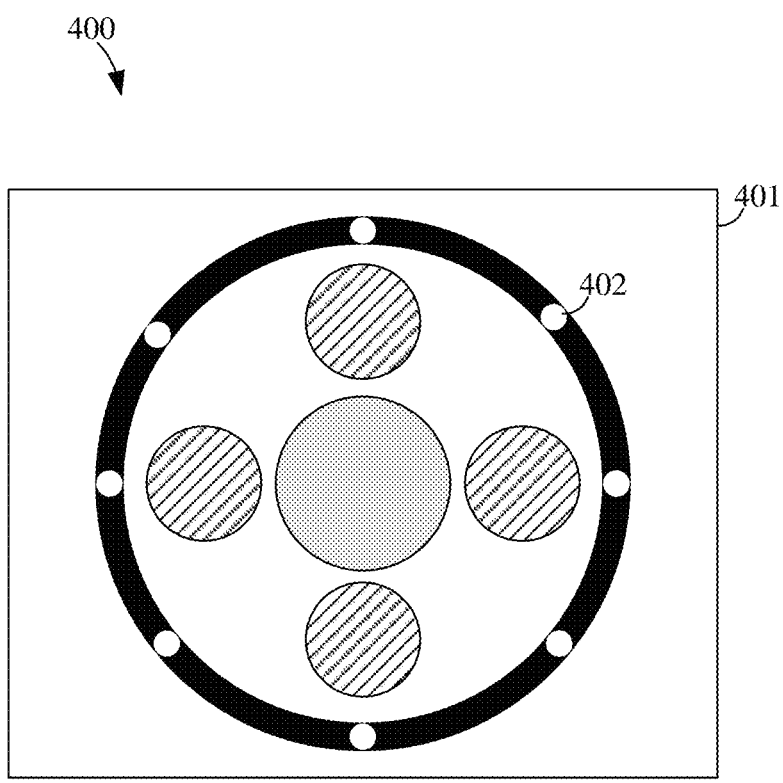
FIG. 4 shows a schematic diagram of a target image.

For example, a schematic diagram 400 of the target image is shown in FIG. 4. A target image 401 may include eight feature points 402 corresponding to material cross-section coordinates. The above-mentioned executive body may use the image in the circular area enclosed by the feature points 402 corresponding to the above-mentioned eight material cross-section coordinates as the above-mentioned material cross-section image. The above-mentioned material cross-section image may be an image corresponding to the cross-section of the "copper stranded wire."

Figure 5:
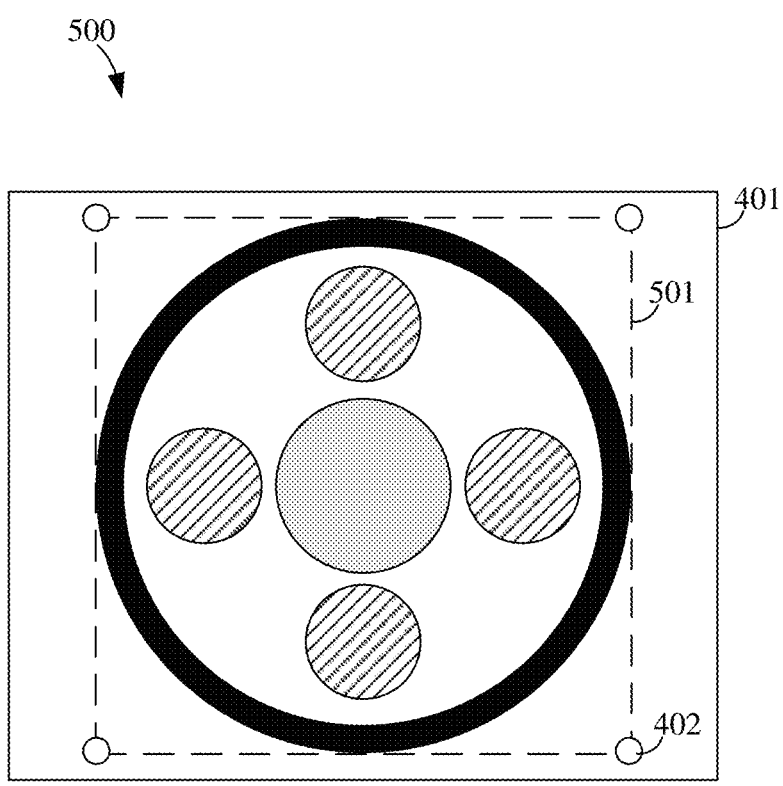
FIG. 5 shows another schematic diagram of the target image.

As another example, another schematic diagram 500 of a target image is shown in FIG. 5. The above-mentioned target image 401 may include four feature points 402 corresponding to material cross-section coordinates. The above-mentioned executive body may construct a rectangular bounding box 501 associated with the feature points 402 corresponding to the above-mentioned four material cross-section coordinates. Then, the center of the rectangular bounding box 501 is taken as the origin, and the image in the circular area with the side length of the rectangular bounding box 501 as the diameter is taken as the material cross-sectional image.

In step 304, which may be optional, the system performs image pre-processing on the material cross-sectional image to generate a pre-processed material cross-sectional image. In some embodiments, the above-mentioned executive body may perform image pre-processing on the material cross-sectional image to generate a pre-processed material cross-sectional image. The above-mentioned image pre-processing may be a process for highlighting the image features of the above-mentioned material cross-sectional image. The above image pre-processing may include, but is not limited to, at least one of the following: image color gamut conversion processing, image brightness adjustment processing, image white balance adjustment processing, image noise removal processing, and image sharpening processing.

As an example, the above-described image color gamut conversion process may be a process of converting an image from an RGB color gamut to an HSV color gamut. The above-mentioned image color gamut conversion process may also be a process of converting an image from the HSV color gamut to the RGB color gamut. The above-mentioned image brightness adjustment process may be a process of reducing the brightness of the high-brightness area in the above-mentioned material cross-sectional image. The above-mentioned image brightness adjustment process may also be a process of increasing the brightness of the low-brightness area in the above-mentioned material cross-sectional image. The above-mentioned image white balance adjustment process may be a process of performing white balance adjustment on the above-mentioned material cross-section image through a white balance adjustment algorithm. For example, the above-mentioned white balance adjustment algorithm may be a white balance adjustment algorithm based on a color temperature curve. The above-mentioned image noise removal processing may be a process of performing noise removal processing on the above-mentioned material cross-section image through a noise removal algorithm. For example, the above-mentioned noise removal algorithm may be, but is not limited to, any one of the following: a mean filter algorithm, a median filter algorithm, a Wiener filter algorithm, and a Gaussian filter algorithm. The above-mentioned image sharpening process may be a process of performing image sharpening on the above-mentioned material cross-section image through an image sharpening algorithm. For example, the above-mentioned image sharpening algorithm may be, but is not limited to, any of the following: an image sharpening algorithm based on a Kirsch operator, an image sharpening algorithm based on a Roberts operator, an image sharpening algorithm based on Sobel operator, an image sharpening algorithm based on a Prewitt operator sub-image sharpening algorithm, and an image sharpening algorithm based on a Laplacian operator.

Optionally, the above-mentioned execution body performs image pre-processing on the above-mentioned material cross-sectional image to generate the above-mentioned pre-processed material cross-sectional image, which may include the following steps:

In the first step, color space conversion is performed on the above-mentioned material cross-section image to generate a first candidate image. As an example, the above-mentioned execution body may convert the above-mentioned material cross-section image from the RGB color gamut to the HSV color gamut to implement color space conversion on the above-mentioned material cross-section image.

In the second step, the brightness of the first candidate image is adjusted to generate a second candidate image. As an example, the execution subject may perform the processing of reducing the brightness of the high-brightness area in the cross-sectional image of the material and increasing the brightness of the low-brightness area in the cross-sectional image of the material to realize the processing of the first candidate image.

In the third step, color space conversion is performed on the second candidate image to generate a third candidate image. As an example, the execution subject may convert the second candidate image from the HSV color gamut to the RGB color gamut, which performs color space conversion on the second candidate image.

The fourth step is to perform white balance adjustment on the above-mentioned third candidate image to generate a fourth candidate image. As an example, the above-mentioned execution subject may use the above-mentioned white balance adjustment algorithm to perform white balance adjustment on the above-mentioned third candidate image.

In the fifth step, noise reduction processing is performed on the fourth candidate image to generate a fifth candidate image. As an example, the above-mentioned execution body may perform noise reduction processing on the above-mentioned fourth candidate image by using the above-mentioned noise point reduction algorithm.

In the sixth step, image sharpening is performed on the fifth candidate image to generate the cross-sectional image of the pre-processed material. As an example, the above-mentioned execution body may perform image sharpening processing on the above-mentioned fifth candidate image by using the above-mentioned image sharpening algorithm.

Step 305, according to the pre-processed material cross-sectional image and the pre-trained material composition detection network, the system generates a material composition area image set. In some embodiments, the above-mentioned execution body may generate a material composition area image set associated with the pre-processed material cross-sectional image and the pre-trained material composition detection network. The material composition detection network may be a network that identifies the region where the material compositions contained in the material to be detected are located from the cross-sectional image of the pre-treated material. The material composition area image in the above-mentioned material composition area image set may be the material contained in the material to be detected, and the image corresponding to the area in the above-mentioned pre-processed material cross-sectional image. As an example, the above material composition detection network may be a Swin Transformer model.

Optionally, the above-mentioned execution body generates the above-mentioned material composition area image set associated with the above-mentioned pre-processed material cross-sectional image and a pre-trained material composition detection network, which may include the following steps:

The first step is to input the above-mentioned pre-processed material cross-sectional image into the above-mentioned pre-trained material composition detection network to generate at least one detection frame information. The detection frame information in the above at least one detection frame information may represent the position and size of the detection frame that frame the area where the material composition is located.

The second step is to determine the area where the material compositions contained in the material to be detected and framed by each detection frame information in the at least one detection frame information, to generate a material composition area image, and to obtain the above material composition area image set.

The above-mentioned execution body may determine the image in the area framed by the detection frame corresponding to the detection frame information as the image of the material composition area. The material composition area image in the above-mentioned material composition area image set may be an image corresponding to the material composition area in the above-mentioned pre-processed material cross-sectional image.

In step 306, the system determines the material composition content information included in the material composition information corresponding to the material composition area image associated with the density of the material composition and the material composition area image. In some embodiments, the above-mentioned execution body may determine the material composition content information included in the material composition information corresponding to the material composition area image associated with the density of the material composition and the material composition area image.

As an example, for the above-mentioned execution body, the density of the material composition corresponding to the material composition area image may be determined by querying the material composition density database. The above-mentioned material composition density database may be a database for storing the density of material compositions. For example, the material composition corresponding to the material composition area image may be "copper." The above executive body may obtain the density of the material composition corresponding to the image of the material composition area through the "SELECT*FROM" material composition density database WHERE material composition="copper." Then, the above-mentioned executive body may determine the product value of the area of the material composition area image and the density of the material composition corresponding to the material composition area image as the above-mentioned material composition content information.

In step 307, according to the material cross-sectional image and the material composition content information corresponding to the material to be detected, the system determines the material proportion information included in the material composition information. In some embodiments, the above-mentioned execution body may determine the material proportion information included in the material composition information corresponding to the material composition area image associated with the above-mentioned material cross-sectional image and the material composition content information.

As an example, the above-mentioned executive body may follow the following algorithm to determine the material proportion information:

Firstly, the above-mentioned body may calculate the area of the material composition region and the area of the cross-section by the following formula:

$$Area_{section}=w_{section}*h_{section}$$

$$Area_{material}=\Sigma w_{material}*h_{material}$$

$$Area_{plastic}=Area_{section}-Area_{material}$$

In above formula, w is the width of above-mentioned detection frame width, and h is the height of detection frame height.

Secondly, the above-mentioned body may determine the density of the material by querying a database, then calculate the mass of the material and the mass of the whole cross-section by the following formula:

$$Mass_{material}=Area_{material}*Density_{material}$$

$$Mass_{plastic}=Area_{plastic}*Density_{plastic}$$

$$Mass_{section}=Mass_{material}+Mass_{plastic}$$

Finally, the above-mentioned body may calculate the ratio of the material composition content information by the following formula:

$$Ratio_{materail} = \frac{Mass_{material}}{Mass_{section}}$$

The ratio is regarded as the material proportion information.

As may be seen from FIG. 3, compared with the description of some embodiments corresponding to FIG. 2, the present disclosure adds a pre-trained material cross-section detection model to determine the coordinates of the material cross-section corresponding to the material to be detected and included in the target image, and obtain the set of material cross-section coordinates, and then associated with the set of material cross-section coordinates, the target image is cropped to generate a material cross-section image. In practice, it is extremely inefficient to determine the proportion of material compositions by manual measurement. In addition, using the similarity model to determine the most similar cross-sectional images to the material cross-section included in the target image requires a large number of pre-labeled cross-sectional images to be stored in the database, and labeling the data often takes much time, resulting in low efficiency in the determination of the material.

The present disclosure may greatly improve the efficiency and accuracy of determining the material cross-section image by determining the material cross-section coordinate set, that is, the feature points of the cross-section boundary. In addition, the present disclosure adds a step of image pre-processing on the material cross-section image. Due to influencing factors such as the amount of incoming light, the image quality is often poor, thereby affecting the subsequent determination of the material cross-section coordinate set. Therefore, by pre-processing the image, the image features contained in the material cross-section image are highlighted.

Figure 6:
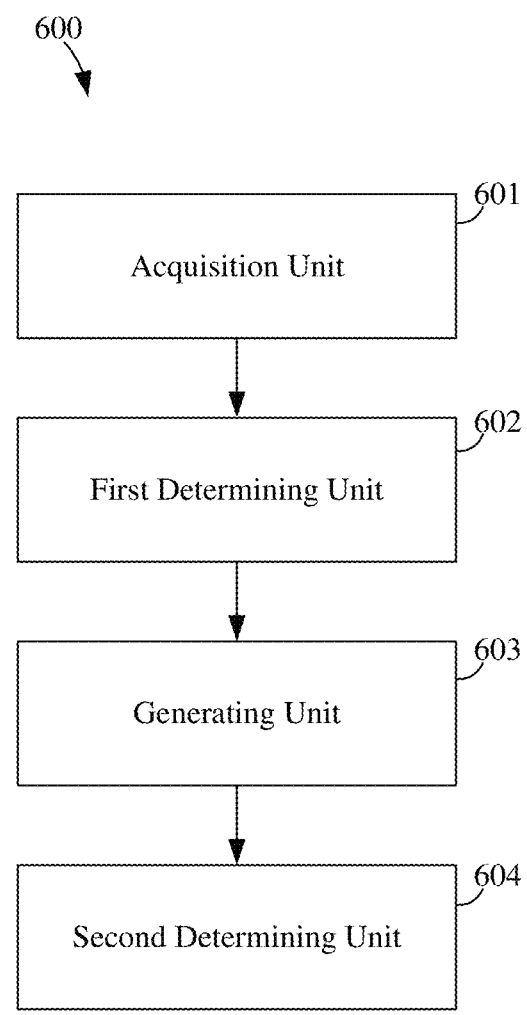
FIG. 6 shows a schematic structural diagram of some embodiments of an apparatus for determining material composition according to the present disclosure.

FIG. 6 shows a schematic structural diagram of some embodiments of an apparatus 600 for determining material composition according to the present disclosure. Such apparatus embodiments may correspond to those method embodiments shown in FIG. 2, and the apparatus may be specifically applied to various electronic devices. As shown in FIG. 6, the apparatus 600 for determining material composition of some embodiments includes: an acquisition unit 601, configured to acquire a target image; a first determining unit 602 which is configured to determine the cross-sectional image of the material corresponding to the material to be detected and included in the target image; a generating unit 603 which is configured to generate a material composition region image set associated with the above-mentioned material cross-sectional image; and a second determining unit 604, which is configured to determine the material composition information corresponding to each material composition area image in the material composition area image set and obtain the material composition information set.

In some optional implementations of some embodiments, the above-mentioned first determining unit 602 is further configured to: determine the coordinates of the material section corresponding to the material to be detected and included in the target image by using the pre-trained material section detection model, and obtain a material section coordinate set; associated with the above-mentioned material cross-section coordinate set, the above-mentioned target image is cropped to generate the above-mentioned material cross-section image.

In some optional implementations of some embodiments, the above generating unit 603 is further configured to: perform image pre-processing on the above-mentioned material cross-section image to generate a pre-processed material cross-section image; associated with the above-mentioned pre-processed material cross-sectional image and the pre-trained material composition detection network, generate the above-mentioned material composition area image set.

In some optional implementations of some embodiments, the material composition information in the above material composition information set includes material composition content information, and the above-mentioned second determining unit 604 is further configured to determine the material composition content information included in the material composition information corresponding to the above-mentioned material composition area image, associated with the density of the material composition, and the above-mentioned material composition area image.

In some optional implementations of some embodiments, the material composition information in the above material composition information set further includes material proportion information, and the above-mentioned second determining unit 604 is further configured to determine the material proportion information included in the material composition information corresponding to the above-mentioned material composition area image, associated with the above-mentioned material cross-sectional image and the material composition content information corresponding to the above-mentioned material to be detected.

In some optional implementations of some embodiments, the above generating unit 603 is further configured to: input the above-mentioned pre-processed material cross-sectional image into the above-mentioned pre-trained material composition detection network to generate at least one detection frame information; determine the area where the material composition contained in the material to be detected is framed by each detection frame information in the at least one detection frame information to generate a material composition area image; and obtain the above material composition area image set.

In some optional implementations of some embodiments, the above generating unit 603 is further configured to: perform color space conversion on the above-mentioned material cross-section image to generate a first candidate image; perform brightness adjustment on the above-mentioned first candidate image to generate a second candidate image; perform color space conversion on the above-mentioned second candidate image to generate a third candidate image; perform white balance adjustment on the above-mentioned third candidate image to generate a fourth candidate image; perform noise reduction processing on the above-mentioned fourth candidate image to generate a fifth candidate image; and perform image sharpening processing on the above-mentioned fifth candidate image to generate the above-mentioned cross-sectional image of the pre-processed material.

It may be understood that the units recorded in the apparatus 600 correspond to the respective steps in the method described with reference to FIG. 2. Therefore, the operations, features and beneficial effects described above with respect to the method are also applicable to the apparatus 600 and the units included therein, and details are not described herein again.

FIG. 7 shows a Swin Transformer model used as a material section detection model. In block 701, a set of images are inputted into a patch partition 703, the output of which enters a feature extraction network. As described above with regards to FIG. 3, the feature extraction network includes four stages 705, 707, 709, and 711, of which each stage comprises multiple Swin Transformer blocks 715. As an example, each stage may contain [2,2,18,2] Swin Transformer blocks. Inside each block, there are Multi-Head Self Attention (MSA) and Multi-Layer Perceptron (MLP) blocks. A LayerNorm (LN) block is applied before each MSA and MLP block, and a residual connection is applied after each MSA and MLP block. The architecture of two successive Swin Transformer blocks 717 and 719 are shown in FIG. 7.

Exemplary System Architecture

An exemplary embodiment of the present disclosure may include one or more servers (management computing entities), one or more networks, and one or more clients (user computing entities). Each of these components, entities, devices, and systems (similar terms used herein interchangeably) may be in direct or indirect communication with, for example, one another over the same or different wired or wireless networks. Additionally, while FIGS. 8 and 9 illustrate the various system entities as separate, standalone entities, the various embodiments are not limited to this particular architecture.

Exemplary Management Computing Entity

Figure 8:
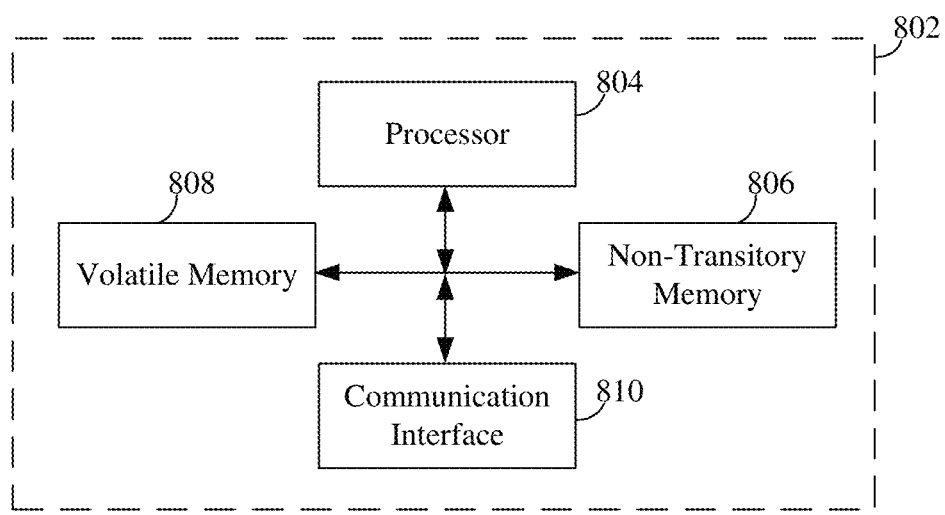
FIG. 8 provides a schematic of a server (management computing entity) according to one embodiment of the present invention.
Figure 9:
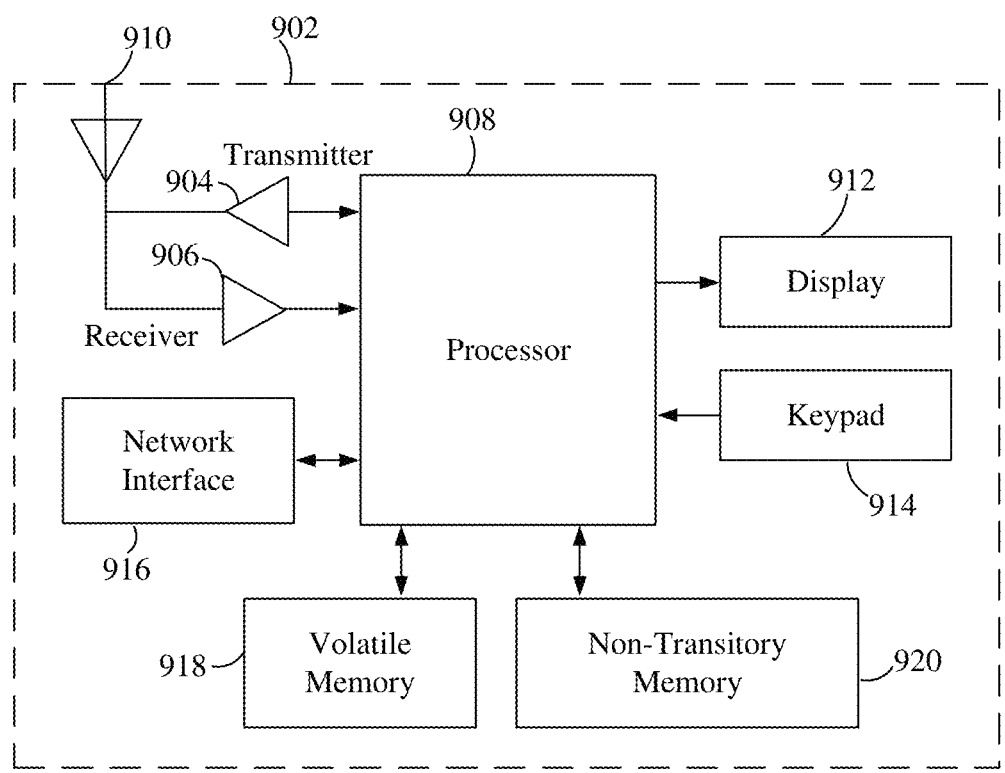
FIG. 9 provides an illustrative schematic representative of a client (user computing entity) that can be used in conjunction with embodiments of the present invention.

FIG. 8 provides a schematic of a server (management computing entity (802)) according to one embodiment of the present disclosure. In general, the terms computing entity, computer, entity, device, system, and/or similar words used herein interchangeably may refer to, for example, vehicles, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably).

As indicated, in one embodiment, the management computing entity (802) may also include one or more communications interfaces (810) for communicating with various computing entities, such as by communicating data, content, and/or information (similar terms used herein interchangeably) that can be transmitted, received, operated on, processed, displayed, stored, and/or the like.

As shown in FIG. 8, in one embodiment, the management computing entity (802) may include or be in communication with one or more processors (i.e., processing elements, (804), also referred to as processors and/or processing circuitry, and similar terms used herein interchangeably) that communicate with other elements within the management computing entity (802) via a bus, for example. As will be understood, the processor (804) may be embodied in a number of different ways. For example, the processor (804) may be embodied as one or more complex programmable logic devices (CPLDs), microprocessors, multi-core processors, coprocessing entities, application-specific instruction-set processors (ASIPs), microcontrollers, and/or controllers. Further, the processor (804) may be embodied as one or more other processing devices or circuitry. The term circuitry may refer to an entire hardware embodiment or a combination of hardware and computer program products. Thus, the processor (804) may be embodied as integrated circuits, application-specific integrated circuits (ASICs), field-programmable gate arrays (FPGAs), programmable logic arrays (PLAs), hardware accelerators, other circuitry, and/or the like. As will therefore be understood, the processor (804) may be configured for a particular use or configured to execute instructions stored in volatile or non-volatile (or non-transitory) media or otherwise accessible to the processor (804). As such, whether configured by hardware or computer program products, or by a combination thereof, the processor (804) may be capable of performing steps or operations according to embodiments of the present disclosure when configured accordingly.

In one embodiment, the management computing entity (802) may further include or be in communication with non-transitory memory (also referred to as non-volatile media, non-volatile storage, non-transitory storage, memory, memory storage, and/or memory circuitry—similar terms used herein interchangeably). In one embodiment, the non-transitory memory or storage may include one or more non-transitory memory or storage media (806), including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile (or non-transitory) storage or memory media may store databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity (802) may further include or be in communication with volatile media (also referred to as volatile storage, memory, memory storage, memory and/or circuitry—similar terms used herein interchangeably). In one embodiment, the volatile storage or memory may also include one or more volatile storage or memory media (808), including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processor (804). Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity (802) with the assistance of the processor (804) and operating system.

As indicated, in one embodiment, the management computing entity (802) may also include one or more communications interfaces (810) for communicating with various computing entities, such as by communicating data, content, and/or information (similar terms used herein interchangeably) that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity (802) may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the management computing entity (802) may include or be in communication with one or more input elements, such as a keyboard input, a mouse input, a touch screen/display input, motion input, movement input, audio input, pointing device input, joystick input, keypad input, and/or the like. The management computing entity (802) may also include or be in communication with one or more output elements (not shown), such as audio output, video output, screen/display output, motion output, movement output, and/or the like.

As will be appreciated, one or more of the components of the management computing entity (802) may be located remotely from other management computing entity (802) components, such as in a distributed system. Furthermore, one or more of the components may be combined and additional components performing functions described herein may be included in the management computing entity (802). Thus, the management computing entity (802) can be adapted to accommodate a variety of needs and circumstances. As will be recognized, these architectures and descriptions are provided for exemplary purposes only and are not limiting to the various embodiments.

Exemplary User Computing Entity

A user may be an individual, a company, an organization, an entity, a department within an organization, a representative of an organization and/or person, and/or the like. FIG. 9 provides an illustrative schematic representative of a client (user computing entity, 902) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities (902) can be operated by various parties. As shown in FIG. 9, the user computing entity (902) can include an antenna (910), a transmitter (904) (e.g., radio), a receiver (906) (e.g., radio), and a processor (i.e., processing element) (908) (e.g., CPLDs, microprocessors, multi-core processors, coprocessing entities, ASIPs, microcontrollers, and/or controllers) that provides signals to and receives signals from the transmitter (904) and receiver (906), respectively.

The signals provided to and received from the transmitter (904) and the receiver (906), respectively, may include signaling information in accordance with air interface standards of applicable wireless systems. In this regard, the user computing entity (902) may be capable of operating with one or more air interface standards, communication protocols, modulation types, and access types. More particularly, the user computing entity (902) may operate in accordance with any of a number of wireless communication standards and protocols, such as those described above with regard to the management computing entity (802). In a particular embodiment, the user computing entity (902) may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity (902) may operate in accordance with multiple wired communication standards and protocols, such as those described above with regard to the management computing entity (802) via a network interface (916).

Via these communication standards and protocols, the user computing entity (902) can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity (902) can also download changes, add-ons, and updates, for instance, to its firmware, software (e.g., including executable instructions, applications, program modules), and operating system.

According to one embodiment, the user computing entity (902) may include location determining aspects, devices, modules, functionalities, and/or similar words used herein interchangeably. For example, the user computing entity (902) may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's (902) position in connection with a variety of other systems, including cellular towers, Wi-Fi access points, and/or the like. Similarly, the user computing entity (902) may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity (902) may also include a user interface (that can include a display (912) coupled to a processor (908) and/or a user input interface coupled to a processor (908). For example, the user interface may be a user application, browser, user interface, and/or similar words used herein interchangeably executing on and/or accessible via the user computing entity (902) to interact with and/or cause display of information from the management computing entity (802), as described herein. The user input interface can include any of a number of devices or interfaces allowing the user computing entity (902) to receive data, such as a keypad (914) (hard or soft), a touch display, voice/speech or motion interfaces, or other input device. In embodiments including a keypad (914), the keypad (914) can include (or cause display of) the conventional numeric (0-9) and related keys (#, *), and other keys used for operating the user computing entity (902) and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity (902) can also include volatile storage or memory (918) and/or non-transitory storage or memory (920), which can be embedded and/or may be removable. For example, the non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory can store databases, database instances, database management systems, data, applications, programs, program modules, scripts, source code, object code, byte code, compiled code, interpreted code, machine code, executable instructions, and/or the like to implement the functions of the user computing entity (902). As indicated, this may include a user application that is resident on the entity or accessible through a browser or other user interface for communicating with the management computing entity (802) and/or various other computing entities.

In another embodiment, the user computing entity (902) may include one or more components or functionality that are the same or similar to those of the management computing entity (802), as described in greater detail above. As will be recognized, these architectures and descriptions are provided for exemplary purposes only and are not limiting to the various embodiments.

Exemplary Client Server Environment

Figure 10:
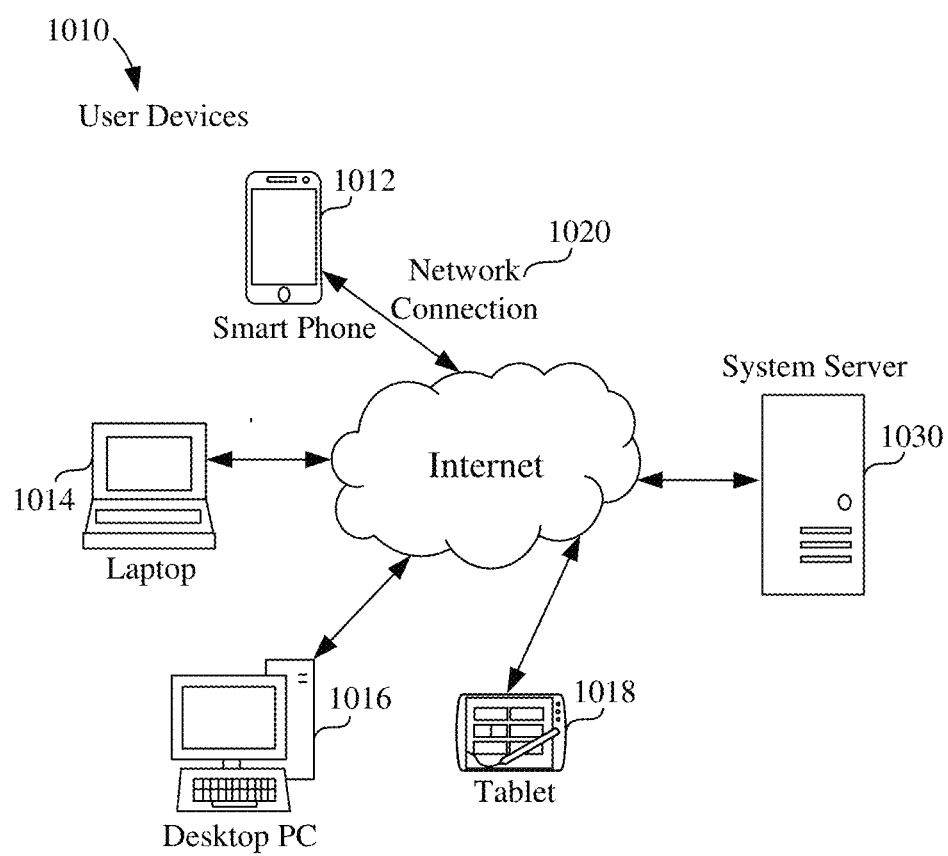
FIG. 10 shows an illustrative system architecture diagram for implementing one embodiment of the present invention in a client-server environment.

The present invention may be implemented in a client server environment. FIG. 10 shows an illustrative system architecture for implementing one embodiment of the present invention in a client-server environment. User devices (i.e., image-capturing device) (1010) on the client side may include smart phones (1012), laptops (1014), desktop PCs (1016), tablets (1018), vehicles (1040), or other devices. Such user devices (1010) access the service of the system server (1030) through some network connection (1020), such as the Internet.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back end component, e.g., as an information/data server, or that includes a middleware component, e.g., an application server, or that includes a front end component, e.g., a client computer having a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In general, the method executed to implement the embodiments of the invention, may be implemented as part of an operating system or a specific application, component, program, object, module, or sequence of instructions referred to as "computer program(s)" or "computer code(s)." The computer programs typically include one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every use case and application is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

What is claimed is:

1. A computer-implemented method for determining a composition of materials of an object, comprising:
   obtaining a target image of the object;
   determining a material cross-sectional image corresponding to a material to be detected and included in the target image;
   determining a most similar candidate image to the target image and corresponding candidate material composition information, wherein the most similar candidate image is selected from a target database;
   generating a material composition area image set comprising a plurality of material composition area images associated with the material cross-sectional image and the most similar candidate image;

determining a set of material composition information corresponding to each of the plurality of material composition area images in the material composition area image set; and obtaining a material composition information set from the set of material composition information.

2. The computer-implemented method of claim 1, wherein determining the material cross-sectional image corresponding to the material to be detected and included in the target image comprises:

determining a set of coordinates of the material cross-sectional image corresponding to the material to be detected and included in the target image;

obtaining a material cross-section coordinate set using a pre-trained material cross-section detection model; and cropping the target image to generate cropped material cross-section images using the material cross-section coordinate set.

3. The computer-implemented method of claim 1, wherein generating the material composition area image set comprising the plurality of material composition area images associated with the material cross-sectional image, comprises:

pre-processing on the material cross-sectional image to generate a pre-processed material cross-sectional image; and generating the material composition area image set by inputting the pre-processed material cross-sectional image into a pre-trained material composition detection network.

4. The computer-implemented method of claim 3, wherein generating the material composition area image set comprising the plurality of material composition area images associated with the material cross-sectional image, further comprises:

inputting the pre-processed material cross-sectional image into the pre-trained material composition detection network to generate at least one set of detection frame information;

determining an area wherein a material composition contained in the material to be detected is framed by the at least one set of detection frame information; and generating a material composition area image.

5. The computer-implemented method of claim 3, wherein pre-processing on the material cross-sectional image to generate the pre-processed material cross-sectional image comprises:

performing color space conversion on the material cross-section image to generate a first candidate image;

performing brightness adjustment on the first candidate image to generate a second candidate image;

performing color space conversion on the second candidate image to generate a third candidate image;

performing white balance adjustment on the third candidate image to generate a fourth candidate image;

performing noise reduction processing on the fourth candidate image to generate a fifth candidate image; and performing image sharpening processing on the fifth candidate image to generate the pre-processed material cross-sectional image.

6. The computer-implemented method of claim 1, wherein the set of material composition information comprises material composition content information and a density of the composition of materials.

7. The computer-implemented method of claim 6, wherein the set of material composition information further comprises material proportion information, wherein determining the set of material composition information corresponding to each of the plurality of material composition area images in the material composition area image set comprises incorporating the material proportion information, and wherein the material proportion information comprises a ratio of a mass of the composition of materials to a mass of the material cross-sectional image.

8. The computer-implemented method of claim 1, further comprising:

inputting the target image of the object into a pre-trained similarity model to generate a target feature vector;

determining a similarity between the target feature vector and a feature vector corresponding to a candidate image stored in a target database and a candidate material composition information; and generating a similarity value and a similarity value set.

9. An electronic device for determining a composition of materials of an object, comprising:

an acquisition unit, configured to acquire a target image;

a first determining unit, configured to determine a material cross-sectional image corresponding to a material to be detected and included in the target image, wherein the material cross-sectional image is a most similar candidate image, and wherein the most similar candidate image is selected from a target database;

a generating unit, configured to generate a material composition area image set comprising a plurality of material composition area images associated with the material cross-sectional image and the most similar candidate image; and a second determining unit, configured to determine a set of material composition information corresponding to each of the plurality of material composition area images in the material composition area image set, and obtain a material composition information set from the set of material composition information.

10. The electronic device of claim 9, further comprising:

one or more processors;

a storage device on which program code are stored;

the program code, when executed by the one or more processors, cause the one or more processors to:

obtain the target image of the object;

determine the material cross-sectional image corresponding to the material to be detected and included in the target image;

determine the most similar candidate image to the target image and corresponding candidate material composition information, wherein the most similar candidate image is selected from the target database;

generate the material composition area image set comprising the plurality of material composition area images associated with the material cross-sectional image and the most similar candidate image;

determine the set of material composition information corresponding to each of the plurality of material composition area images in the material composition area image set; and obtain the material composition information set from the set of material composition information.

11. A computer-readable non-transitory medium having stored thereon program code for determining a composition of materials of an object, wherein the program code, when executed by a processor, causes the processor to:

obtain a target image of the object;

determine a material cross-sectional image corresponding to a material to be detected and included in the target image;

determine a most similar candidate image to the target image and corresponding candidate material composition information, wherein the most similar candidate image is selected from a target database;

generate a material composition area image set comprising a plurality of material composition area images associated with the material cross-sectional image and the most similar candidate image;

determine a set of material composition information corresponding to each of the plurality of material composition area images in the material composition area image set; and obtain a material composition information set from the set of material composition information.

12. The computer-readable non-transitory medium of claim 11, wherein the program code to determine the material cross-sectional image corresponding to the material to be detected and included in the target image comprises program code to:

determine a set of coordinates of the material cross-sectional image corresponding to the material to be detected and included in the target image;

obtain a material cross-section coordinate set using a pre-trained material cross-section detection model; and crop the target image to generate cropped material cross-section images using the material cross-section coordinate set.

13. The computer-readable non-transitory medium of claim 11, wherein the program code to generate the material composition area image set comprising the plurality of material composition area images associated with the material cross-sectional image, comprises program code to:

pre-process on the material cross-sectional image to generate a pre-processed material cross-sectional image; and generate the material composition area image set by inputting the pre-processed material cross-sectional image into a pre-trained material composition detection network.

14. The computer-readable non-transitory medium of claim 13, wherein the program code to generate the material composition area image set comprising the plurality of material composition area images associated with the material cross-sectional image, further comprises program code to:

input the pre-processed material cross-sectional image into the pre-trained material composition detection network to generate at least one set of detection frame information;

determine an area wherein a material composition contained in the material to be detected is framed by the at least one set of detection frame information; and generate a material composition area image.

15. The computer-readable non-transitory medium of claim 13, wherein the program code to pre-process on the material cross-sectional image to generate the pre-processed material cross-sectional image comprises program code to:

perform color space conversion on the material cross-section image to generate a first candidate image;

perform brightness adjustment on the first candidate image to generate a second candidate image;

perform color space conversion on the second candidate image to generate a third candidate image;

perform white balance adjustment on the third candidate image to generate a fourth candidate image;

perform noise reduction processing on the fourth candidate image to generate a fifth candidate image; and perform image sharpening processing on the fifth candidate image to generate the pre-processed material cross-sectional image.

16. The computer-readable non-transitory medium of claim 11, wherein the set of material composition information comprises material composition content information and a density of the composition of materials.

17. The computer-readable non-transitory medium of claim 16, wherein the set of material composition information further comprises material proportion information, wherein the program code to determine the set of material composition information corresponding to each of the plurality of material composition area images in the material composition area image set comprises program code to incorporate the material proportion information, and wherein the material proportion information comprises a ratio of a mass of the composition of materials to a mass of the material cross-sectional image.

18. The computer-readable non-transitory medium of claim 11, wherein the program code further causes the processor to:

input the target image of the object into a pre-trained similarity model to generate a target feature vector;

determine a similarity between the target feature vector and a feature vector corresponding to a candidate image stored in a target database and a candidate material composition information; and generate a similarity value and a similarity value set.

* * * * *